United States Patent
Leboeuf et al.

(10) Patent No.: US 10,415,719 B2
(45) Date of Patent: Sep. 17, 2019

(54) VALVE AND CHOKE STEM PACKING ASSEMBLIES

(71) Applicant: SAINT-GOBAIN PERFORMANCE PLASTICS CORPORATION, Solon, OH (US)

(72) Inventors: Mathilde Leboeuf, Ixelles (BE); Jan Kustermans, Kontich (BE); Rojendra Singh, Natick, MA (US); Christophe Valdenaire, Clapiers (FR); Filip Rousseau, Niel (BE); Herman M. Dubois, Kontich (BE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 14/502,892

(22) Filed: Sep. 30, 2014

(65) Prior Publication Data

US 2015/0102247 A1    Apr. 16, 2015

Related U.S. Application Data

(60) Provisional application No. 61/884,760, filed on Sep. 30, 2013, provisional application No. 61/939,020, (Continued)

(51) Int. Cl.
*F16K 41/04* (2006.01)
*F16K 3/02* (2006.01)
(Continued)

(52) U.S. Cl.
CPC ............... *F16K 41/04* (2013.01); *F16J 15/18* (2013.01); *F16J 15/3236* (2013.01); *F16K 3/02* (2013.01)

(58) Field of Classification Search
CPC .... F16J 15/00; F16J 15/02; F16J 15/16; F16J 15/18; F16J 15/20; F16K 41/04
(Continued)

(56) References Cited

U.S. PATENT DOCUMENTS 2,188,957 A    2/1940 Pfauser
3,013,830 A    12/1961 Milligan
(Continued)

FOREIGN PATENT DOCUMENTS

JP    05-019735 U    3/1993
WO    02/33293 A2    4/2002
(Continued)

OTHER PUBLICATIONS

International Search Report for PCT Application No. PCT/US2014/058421 dated Jan. 9, 2015.

*Primary Examiner* — Kristina R Fulton
*Assistant Examiner* — L. Susmitha Koneru
(74) *Attorney, Agent, or Firm* — Abel Schillinger, LLP; Chi Suk Kim

(57) ABSTRACT

A stem packing assembly including a first annular member defining a central axis, a second annular member defining a central axis coaxial with the central axis of the first annular member, and an annular energizing member defining a central axis coaxial with the central axis of the first annular member. In an embodiment, the stem packing assembly can have a leakage rate according to ISO 15848-1 of less than $1\times10^{-4}$ mgs$^{-1}$m$^{-1}$ for at least 500 cycles at 160° C., and less than $1\times10^{-4}$ mgs$^{-1}$m$^{-1}$ for at least 500 cycles at −46° C. In another embodiment, the first annular member can include a PAEK, the second annular member can include a PTFE, and the annular energizing member at least partially includes a PTFE.

19 Claims, 8 Drawing Sheets

Related U.S. Application Data filed on Feb. 12, 2014, provisional application No. 61/968,429, filed on Mar. 21, 2014.

(51) Int. Cl.
  *F16J 15/18* (2006.01)
  *F16J 15/3236* (2016.01)

(58) Field of Classification Search
  USPC .................................................. 277/511–542
  See application file for complete search history.

(56) References Cited

U.S. PATENT DOCUMENTS

| | | | |
|---|---|---|---|
| 3,027,168 A | 3/1962 | Herbruggen | |
| 3,445,087 A | 5/1969 | Priese et al. | |
| 3,512,787 A | 5/1970 | Kennedy et al. | |
| 3,627,260 A | 12/1971 | Grove | |
| 4,006,881 A | 2/1977 | Gaillard | |
| 4,090,719 A | 5/1978 | Simanskis et al. | |
| 4,214,761 A | 7/1980 | Pippert | |
| 4,283,062 A * | 8/1981 | Catanzaro | B29C 45/17 277/520 |
| 4,328,974 A | 5/1982 | White et al. | |
| 4,379,557 A | 4/1983 | Saka | |
| 4,394,023 A | 7/1983 | Hinojosa | |
| 4,398,731 A | 8/1983 | Gorman et al. | |
| 4,474,382 A | 10/1984 | Hjelsand | |
| 4,475,712 A | 10/1984 | DeJager | |
| 4,516,752 A | 5/1985 | Babbitt et al. | |
| 4,527,806 A * | 7/1985 | Ungchusri | F16J 15/20 277/530 |
| 4,576,385 A | 3/1986 | Ungchusri et al. | |
| 4,577,872 A | 3/1986 | Bake et al. | |
| 4,640,305 A | 2/1987 | Johnson | |
| 4,930,748 A | 6/1990 | Gonsior | |
| 5,129,624 A | 7/1992 | Icenhower et al. | |
| 5,178,363 A | 1/1993 | Icenhower et al. | |
| 5,263,682 A | 11/1993 | Covert et al. | |
| 6,273,431 B1 * | 8/2001 | Webb | 277/529 |
| 7,959,159 B2 * | 6/2011 | Hocker | F02M 59/442 277/559 |
| 2009/0146379 A1 * | 6/2009 | Foster | F16J 15/3236 277/307 |
| 2013/0043661 A1 * | 2/2013 | Binder | F16J 15/322 277/554 |
| 2013/0045104 A1 * | 2/2013 | Giovannetti | F04D 29/266 416/198 A |
| 2013/0087977 A1 * | 4/2013 | Galle | E21B 33/04 277/314 |
| 2013/0180733 A1 * | 7/2013 | Bradshaw | F16J 15/166 166/387 |

FOREIGN PATENT DOCUMENTS

| | | | | |
|---|---|---|---|---|
| WO | WO 2012121745 A2 * | 9/2012 | | E21B 33/1212 |
| WO | 2015048784 A1 | 4/2015 | | |

* cited by examiner

VALVE AND CHOKE STEM PACKING ASSEMBLIES

CROSS-REFERENCE TO RELATED APPLICATION(S)

This application claims priority under 35 U.S.C. § 119(e) to U.S. patent application Ser. No. 61/884,760 entitled "VALVE AND CHOKE STEM PACKING ASSEMBLIES," by Mathilde Leboeuf, et al., filed Sep. 30, 2013; claims priority under 35 U.S.C. § 119(e) to U.S. patent application Ser. No. 61/939,020 entitled "VALVE AND CHOKE STEM PACKING ASSEMBLIES," by Jan Kustermans, et al., filed Feb. 12, 2014; claims priority under 35 U.S.C. § 119(e) to U.S. patent application Ser. No. 61/968,429 entitled "VALVE AND CHOKE STEM PACKING ASSEMBLIES," by Jan Kustermans, et al., filed Mar. 21, 2014, of which all are assigned to the current assignee hereof and incorporated herein by reference in their entirety.

FIELD OF THE DISCLOSURE

The present disclosure relates to valve and choke stem packing assemblies, and more particularly to stem packing assemblies adapted for use at a range of temperatures.

RELATED ART

Stem and valve packing assemblies generally serve to provide a seal through which a rotatable stem or axle can pass. The assembly prevents transmission of a fluid therethrough, effectively preventing leakage and unwanted fluid escape from a valve while simultaneously providing a bearing surface for an internal stem or axle to rotate and axially translate. While certain valve stems are designed to operate in pure angular rotation, many valve stems operate in a combination of rotational and axial movement such as to translate rotational movement into axial movement.

Traditional stem packing assemblies are constructed from elastomeric materials which can frequently exhibit thermal expansion and contraction during exposure to fluctuating temperatures and pressures. As pressure increases and decreases in the assembly, the elastomeric materials may creep so as to degrade the sealing interface.

Various standards exist for classifying stem and valve packing assemblies. For example, the International Organization of Standardization set forth ISO 15848-1, titled Industrial valves—Measurement, test and qualification procedures for fugitive emissions. Under ISO 15848-1, valves are assigned a classification based on overall seal effectiveness and fluid retention. Traditional packing assemblies generally perform up to desired specifications at room temperature and above (e.g., up to 200° C.). However, these assemblies are typically not suitable for operation at low temperatures, and fail when subjected to low temperatures (e.g., −46° C.) during sustained loading cycles.

Therefore, a present need exists to develop a new type of packing assembly which can sustain operation at both low (e.g., −46° C.) and high (e.g., 160° C.) temperatures during loading cycles.

BRIEF DESCRIPTION OF THE DRAWINGS

Embodiments are illustrated by way of example and are not limited in the accompanying figures.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the terms "creep" and "flow" are intended to refer to the elastic and plastic deformation and volumetric movement undergone by a solid during subjection to a load or mechanical stress. Examples of a "fluid" include gases, vapors, liquids, and slurries. Unless otherwise defined, all other technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the valve and stem packing arts.

The concepts are better understood in view of the embodiments described below that illustrate and do not limit the scope of the present invention. The following description is directed to valve and stem packing assemblies, and particularly, to packing assemblies that can sustainably operate at both low and high temperatures.

Figure 1:
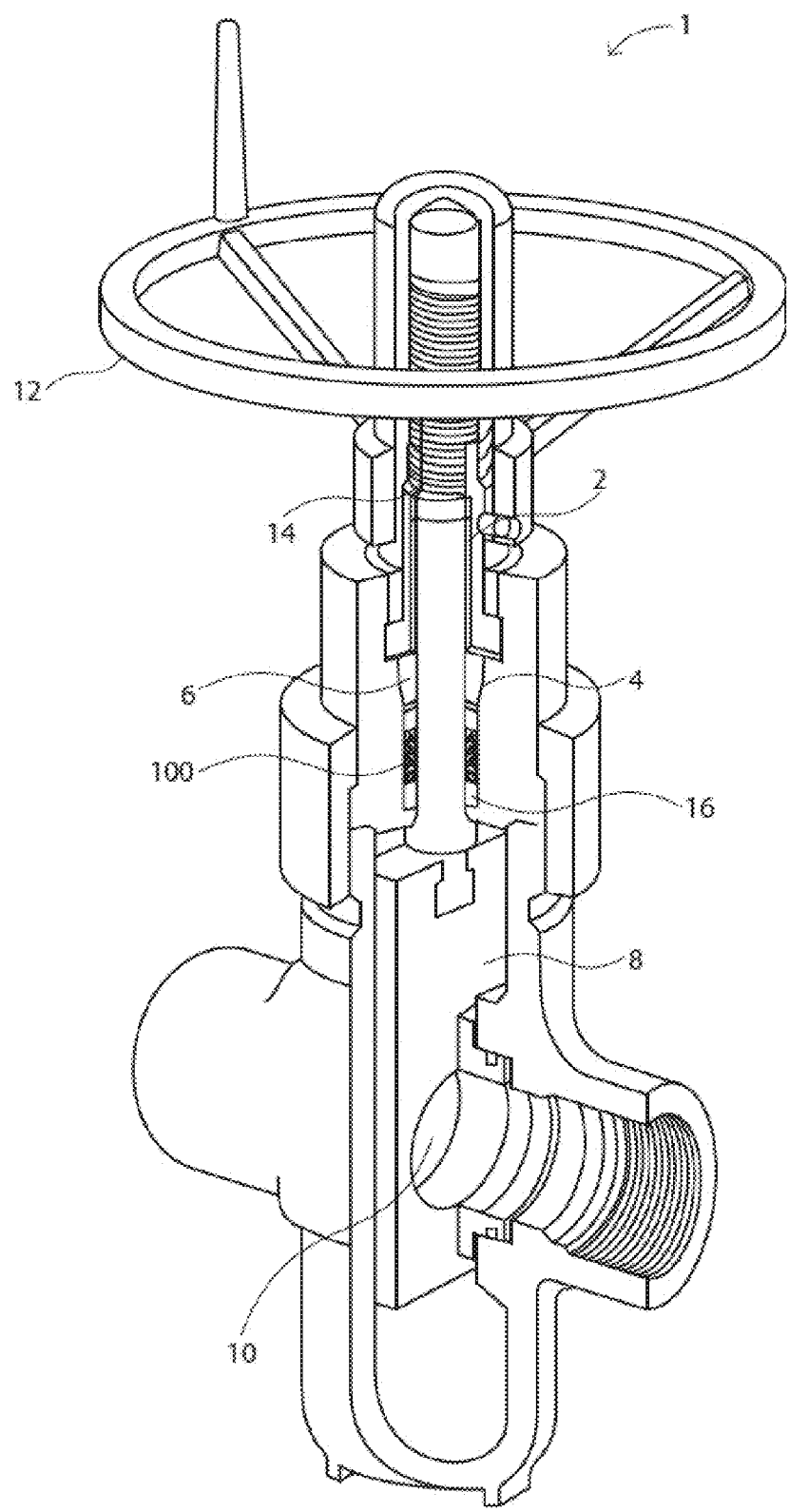
FIG. 1 includes a perspective view of a gate valve integrating a packing assembly in accordance with an embodiment.

Referring initially to FIG. 1, a gate valve 1 is shown. The gate valve 1 can generally include a valve stem 2 inserted into a bonnet 4. A radial gap 16 can be formed therebetween. The bonnet 4 can define an internal chamber 6 in which the valve stem 2 can be operatively positioned. The valve stem 2 can extend through the chamber 6 to a lower gate 8 which can longitudinally translate between an open and closed position upon the urging of the valve stem 2.

The gate valve 1 can employ the use of a packing assembly 100 to provide sealing between the valve stem 2 and bonnet 4 and can provide a bearing surface for rotation and axial translation of the valve stem 2.

In particular embodiments, the valve stem 2 can move between an upper position, wherein the gate 8 is open to allow for a fluid flow through a passageway 10, and a lower position where the gate 8 is closed to prevent fluid flow through the passageway 10. A hand wheel 12, or any other suitable means, can be attached to the uppermost portion of the valve stem 2 to affect axial translation of the valve stem 2. A plurality of helical threads 14 positioned along the inner wall of the bonnet 2 can further facilitate longitudinal translation of the valve stem 2. It should be understood that, the packing assembly 100 can be further utilized in stems that operate exclusively in rotation or reciprocation, and is not solely intended for use in a gate valve as illustrated.

Figure 2:
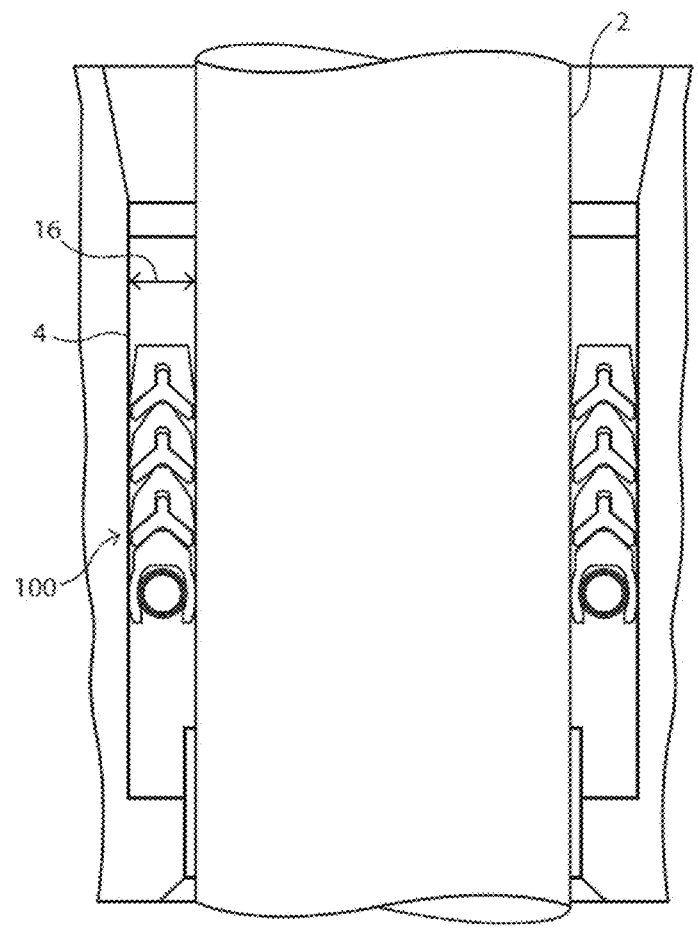
FIG. 2 includes an enlarged side view of the valve of FIG. 1 in accordance with an embodiment.

FIG. 2 illustrates an enlarged cross sectional view of the gate valve. A radial gap 16 can be defined by a distance between the valve stem 2 and the bonnet 4, such that the valve stem 2 can freely rotate within the internal chamber 6. The radial gap 16 can have a diameter, $D_G$, as defined by the distance between an outermost surface of the valve stem 2 and the inner wall of the bonnet 4. In particular embodiments, it may be desirable to have a radial gap 16 with a large $D_G$ to optimally affect valve operation. However, as $D_G$ increases, the fluid forces and pressures generated within the radial gap 16 can increase such that larger forces are necessary to prevent leakage of fluid through the radial gap 16.

In particular embodiments, the packing assembly 100 can have a thickness, $T_{PA}$, as measured from a radially innermost surface of the assembly 100 to a radially outermost surface of the assembly 100, which is greater than or equal to $D_G$. In particular embodiments, $T_{PA}$ can be at least 1.00 $D_G$, such as at least 1.01 $D_G$, at least 1.02 $D_G$, at least 1.03 $D_G$, at least 1.04 $D_G$, at least 1.05 $D_G$, or even at least 1.10 $D_G$. In more particular embodiments, $T_{PA}$ can be no greater than 1.2 $D_G$, such as no greater than 1.3 $D_G$, no greater than 1.4 $D_G$, or even no greater than 1.5 $D_G$. $T_{PA}$ can also be within a range between and including any of the values described above, such as, for example, between 1.05 $D_G$ and 1.10 $D_G$. One of ordinary skill will understand after reading the entire detailed description that too great of a difference between $D_G$ and $T_{PA}$ can result in cracking of the packing assembly 100 during operation or difficulty during assembly thereof.

Figure 3:
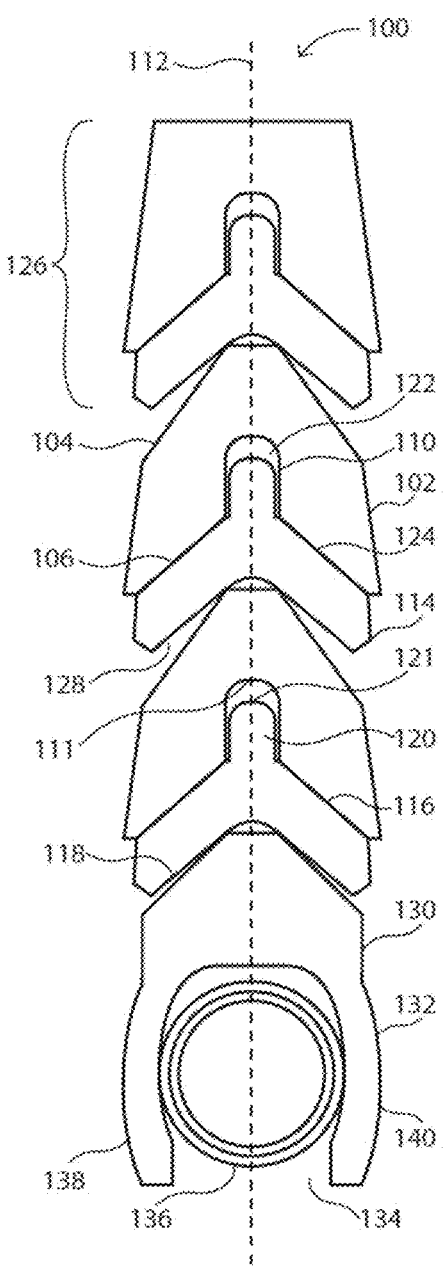
FIG. 3 includes an enlarged side view of a packing assembly in accordance with an embodiment.

Referring now to FIG. 3, the packing assembly 100 can generally include a plurality of first members 102, each interspaced by a second member 114. The first and second members 102 and 114 can be generally annular and can define a cross sectional center line 112. In a particular embodiment, the first members 102 can be formed of a softer material, e.g., a viscoelastic material, while the second members 114 can be formed from a material having a low coefficient of linear thermal expansion, a low elongation at break, a high tensile strength, or a low deformation under load.

The first members 102 can be made of a material adapted to flow, or creep, upon application of a longitudinal force along, or generally along, the cross sectional center line 112. In this regard, the first members 102 can change shape upon exposure to compressive forces and can better seal the radial gap.

Referring to adjacent first and second members 102 and 114, the first members 102 can each have a generally V-shaped cross sectional profile. In this regard, the first members 102 can each define a first surface 104 and a second surface 106 opposite the first surface 104. In an embodiment, the first and second surfaces 104 and 106 can be parallel to one another. In another embodiment, the first and second surfaces 104 and 106 can be positioned with a relative angle therebetween.

Figure 9:
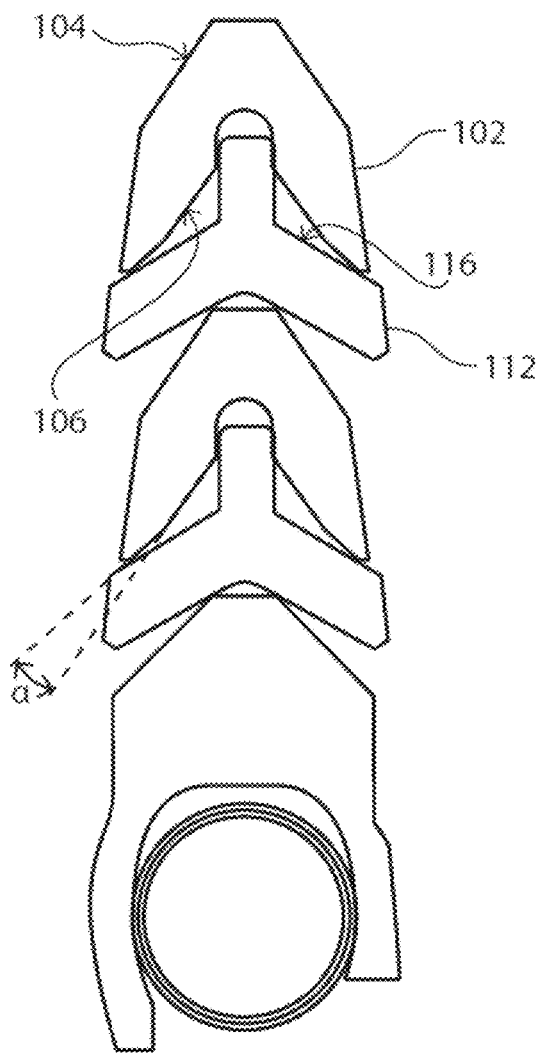
FIG. 9 includes an enlarged side view of a packing assembly in accordance with an embodiment.

In a particular embodiment, as illustrated in FIG. 9, at least one of the first and second surfaces 104 and 106 of the first member 102 can define one or more internal angles so as to define two or more segments offset by a relative angle, α. In particular embodiments, α can be at least 5°, such as at least 10°, at least 25°, or even at least 45°. In further embodiments, a can be no greater than 60°, such as no greater than 50°, or even no greater than 45°. Moreover, a can be within a range between and including any of the values described above, such as, for example, between 10° and 20°. In an embodiment, the relative angle, α, may permit a first surface 116 of the second member 114 to splay, or spread, the first member 102 in a radial direction upon application of an axial loading condition. This can enhance sealing characteristics of the packing assembly 100.

Referring again to FIG. 3, a groove 110 can extend into each of the first members 102 from the second surface 106. In an embodiment, the groove 110 can extend in a direction along the cross sectional center line 112.

The second members 114 can each have a generally Y-shaped cross sectional profile. The second members 114 can each have a first surface 116 and a second surface 118 opposite the first surface. In an embodiment, the first and second surfaces 116 and 118 of the second members 114 can be parallel to one another. In another embodiment, the first and second surfaces 116 and 118 of the second members 114 can have a relative angle therebetween.

In particular embodiments, an axial notch 120 can project from the first surface 116 of the second member 114 and can extend substantially parallel with the cross sectional center line 112 of the assembly 100. The notch 120 can be shaped and sized to fit within the groove 110 of the first member 102, leaving a gap 122 between a tip 121 of the notch 120 and an apex 111 of the groove 110. Alignment of the groove 110 with the notch 120 can prevent axial misalignment of the assembly 100 and better control flow of the first member 102 during loading conditions.

In certain embodiments, a bonding material 124 can be applied between the second surface 106 of the first member 102 and the first surface 116 of the second member 114, forming a discrete sealing element 126. In alternate embodiments, the first and second members 102 and 114 can be free of a bonding material, and can move relative to each other.

In particular embodiments, the second surface 118 of the second member 114 can define an angle with respect to the first surface of the first member 102, thus establishing an annular void 128 between adjacent sealing elements 126. Upon axial loading along the cross sectional center line 112, the voids 128 can disappear. In this regard, at least one of the sealing elements 126 can automatically retrofit to the dimensional radial gaps 16.

When the packing assembly 100 is initially exposed to a loading condition, as caused by internal valve pressure, the second surfaces 118 of the second members 114 can expand radially to affect an initial pressure seal with the valve stem. Enhanced sealing characteristics can occur as the pressure continues to increase within the assembly 100 and the second members 114 compress the first members 102. This compression can cause radial flow of the first members 102 and dynamically seal the chamber of the valve.

In an embodiment, the packing assembly 100 can further include an energizing member 130. The energizing member 130 can be positioned in axial alignment with the cross sectional center line 112. In an embodiment, the energizing member 130 can have a generally U-shape that provides a retaining function for aligning and maintaining the packing assembly 100 in proper position and orientation within the chamber of the valve. Moreover, the energizing member 130 can provide structural support to the first and second members 102 and 114 while serving at least partially as a bearing for the valve stem within the bonnet as the valve stem is rotated to open and close the gate.

In an embodiment, the energizing member 130 can comprise a jacket 132 having a first extension 138 and a second extension 140 defining an internal cavity 134 therebetween. In particular embodiments, the first extension 138 can define an inner diameter, ID, of the packing assembly 100, and the second extension 140 can define an outer diameter, OD, of the packing assembly 100. In other embodiments, the first extension 138 can define an outer diameter, OD, of the packing assembly 100, while the second extension 138 can define an inner diameter, ID, of the packing assembly 100. In this regard, the cross-sectional profile of the packing assembly 100 can be reversible.

In an embodiment, an energized element 136 can be at least partially disposed within the internal cavity 134 of the jacket 132. In particular embodiments, the energized element 136 can comprise a spring defining a torus. The spring can form an interference fit with the first and second extensions 138 and 140, and can provide a radially outward biasing force thereagainst.

Figure 5:
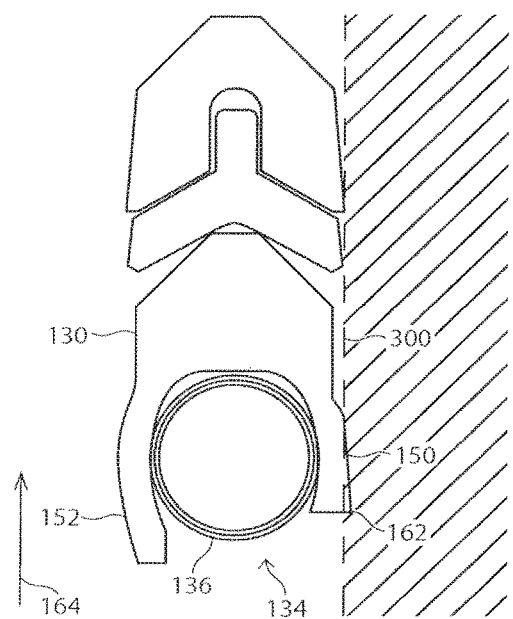
FIG. 5 includes an enlarged side view of a portion of a packing assembly in accordance with an embodiment.

In another embodiment, such as illustrated in FIG. 5, the energizing member 130 can include a first extension 150 having a scraper 162 extending in a radial direction, e.g., radially inward or radially outward and a second extension 152 disposed opposite the energized element 136. In a particular embodiment, the scraper 162 can contact a sidewall 300 of an inner or outer component. In such a manner, the scraper 162 can enhance sealing characteristics of the packing assembly 100 by forming a longer sealing interface. Particularly, the scraper 162 may enhance the sealing characteristic of the packing assembly against a fluidic pressure directed as indicated by arrow 164. The first extension 150 and scraper 162, as illustrated in FIG. 5, are shown exaggerated into a sidewall of the inner or outer component in an undeformed state as they would appear prior to installation.

Figure 4:
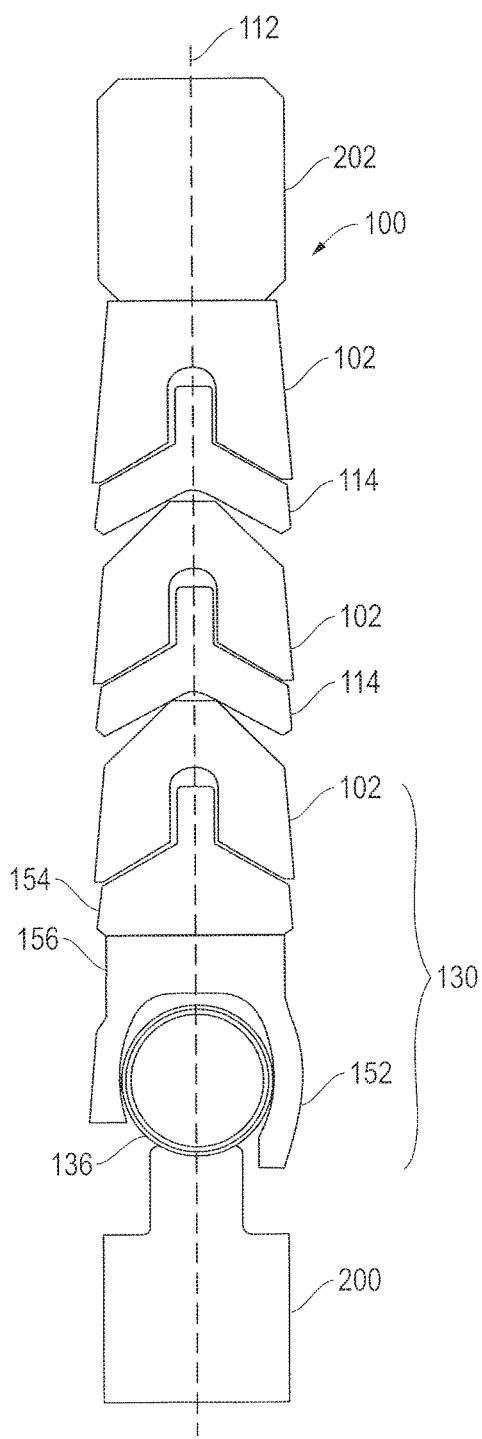
FIG. 4 includes an enlarged side view of a packing assembly in accordance with an embodiment.
Figure 6:
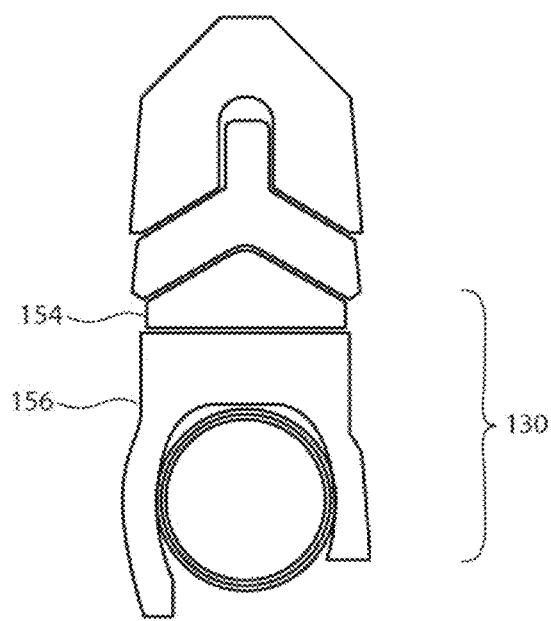
FIG. 6 includes an enlarged side view of a portion of a packing assembly in accordance with an embodiment.
Figure 7:
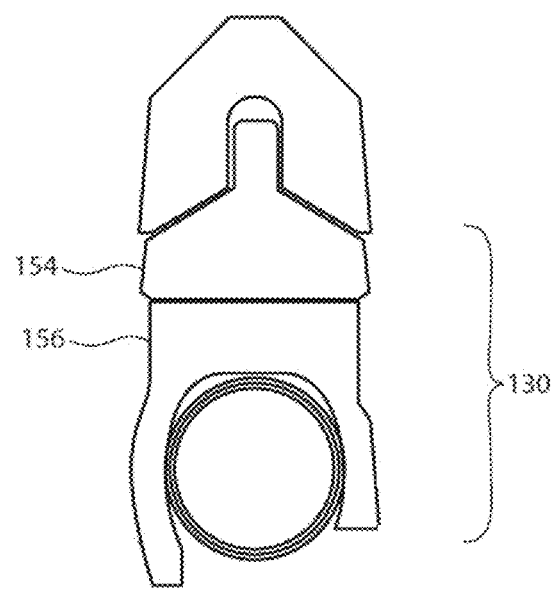
FIG. 7 includes an enlarged side view of a portion of a packing assembly in accordance with an embodiment.

In particular embodiments, such as those illustrated in FIGS. 4, 6, and 7, the energizing member 130 can include a first component 154 and a second component 156. The first and second components 154 and 156 can be in axial alignment with each other. In particular, the first component 154 can be in axial communication with the lowermost first member 102 of the packing assembly (FIG. 4). This may provide the second component 156 greater ability to float, or translate, relative to the first component 154 in an axial direction along the cross sectional center line 112. In such a manner, the energizing member 130 can better compensate for irregularities within the chamber of the valve, and can retrofit for wear and misalignment between the stem and the valve bonnet.

Figure 8A:
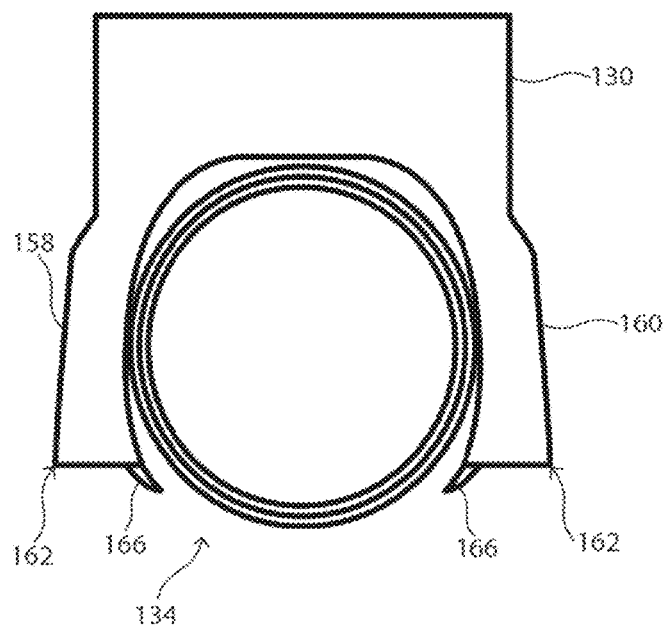
FIG. 8A includes an enlarged side view of an energizing member in accordance with an embodiment.

Referring again to FIG. 3, in an embodiment, the first and second extensions 138 and 140 of the energizing member 130 can have the same, or similar, cross sectional profiles and lengths. In further embodiments, such as that illustrated in FIG. 8A, the first and second extensions 158 and 160 can each include a scraper 162. At least one retention feature 166 can be disposed along an inner surface of the internal cavity 134 in order to secure the energized element 136 and prevent axial dislodgement thereof. One of ordinary skill in the art will recognize after reading the entire detailed description that the shape of the retention feature 166 is not limited by the disclosure in FIG. 8A.

Figure 8B:
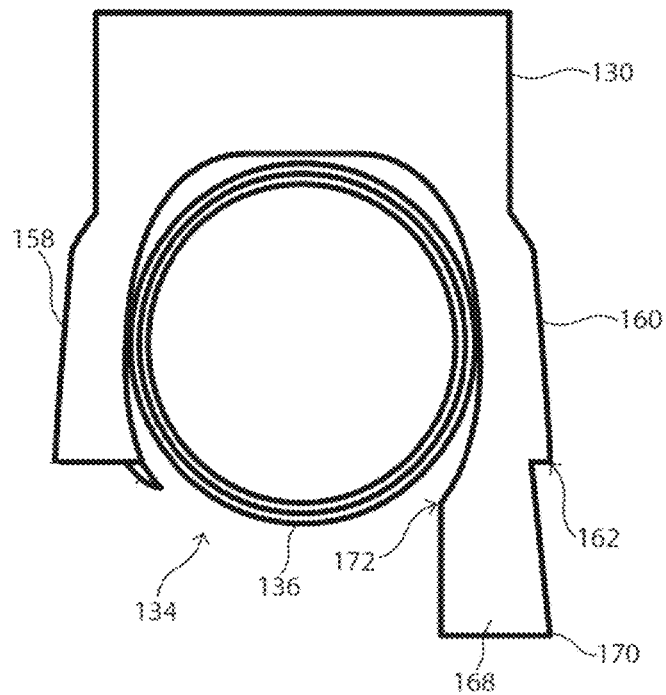
FIG. 8B includes an enlarged side view of an energizing member in accordance with an embodiment.

Referring now to FIG. 8B, in particular embodiments, a retaining axial extension 168 can extend from a distal end of at least one of the first and second axial extensions 158 and 160. In certain embodiments, the retaining axial extension 168 can have a generally polygonal shape when viewed in cross section. In other embodiments, the retaining axial extension 168 can have a generally ellipsoidal shape when viewed in cross section. The retaining axial extension 168 can form a point of contact with one of an inner and an outer component at end point 170. In such a manner, the energizing member 130 can form two points of contact with an inner or an outer component at the scraper 162 and at the end point 170. This can increase sealing performance of the packing assembly 100.

In addition, the retaining axial extension 168 can secure the energized element 136 within the internal cavity 134 by use of a securing feature 172, or lip.

In further embodiments, each of the first and second axial extensions 158 and 160 may have a retaining axial extension 168 extending from a distal end thereof. This may increase the sealing performance of the packing assembly 100 while further retaining the energized element 136 within the internal cavity 134.

As illustrated in FIG. 4, the packing assembly 100 can additionally include a third member 200 disposed adjacent to the energized element 136. In this regard, the energized element 136 can be disposed between the third member 200 and the first member 102. The third member 200 can help retain the energized element 136 within the internal cavity 134 and can enhance sealing characteristics exhibited upon pressure in a direction as indicated by line 164 (FIG. 5). Moreover, the third member 200 can reduce axial spacing within the chamber 6 of the valve 1 (FIG. 1).

In an embodiment, the packing assembly 100 can include a fourth member 202 disposed opposite the third member 200. The fourth member 202 can assist in compressing the packing assembly 100 upon loading conditions. Moreover, the fourth member 202 may help avoid axial dislodgement or deformation of the packing assembly 100.

Each of the first members 102 can comprise a polymer. Inert polymers may be preferable in applications in which potable, medical, or sensitive fluids are to be handled. In this regard, use of a fluoropolymer may be desirable. For example, in particular embodiments the first members 102 can each comprise a polytetrafluoroethylene (PTFE). In other embodiments, the first members 102 can comprise a fluoropolymer such as a polyvinylidene fluoride (PVDF), a perfluoroalkoxy (PFA), a polychlorotrifluoroethylene (PCTFE), a polyethylenetetrafluoroethylene (ETFE), a vinylidene fluoride (THV), a polyethylenechlorotrifluoroethylene (ECTFE), or any combination thereof. While these polymers do not have the full fluorination of PTFE, they can exhibit sufficient chemical inertness. It will be recognized that this list is not exhaustive and that other materials can also be used in the composition of the first members 102.

In particular embodiments, the first members 102 can each comprise a PTFE, such as, for example, FLUOROLOY® A02 (available from Saint-Gobain Performance Plastics). FLUOROLOY® A02 exhibits a tensile strength, as measured according to ASTM D4894, of 36.5 MPa, an elongation, as measured according to ASTM D4894, of 500%, a compressive modulus, as measured according to ASTM D695, of 572 MPa, a deformation under load, as measured according to ASTM D621 and as tested at 2,000 PSI for 24 hours, of 4.6%, a Shore D hardness, as measured according to ASTM D2240, of between 50 and 65, and a coefficient of linear thermal expansion, as measured according to ASTM E831 between 26° C. and 200° C., of 12.6 m/m/° C. Moreover, FLUOROLOY® A02 has a working temperature range of between −268° C. and 316° C.

Each the second members 114 can comprise a polymer. More particularly, each of the second members 114 can comprise a dense polymer. For example, the second members 114 can comprise an aramid, such as an aromatic polyamide, an aromatic polyester, an aromatic polyether, or an aromatic polyurethane, as these materials exhibit a low coefficient of linear thermal expansion and a low elongation at break. Some illustrative polymers include: polyimides (such as, for example, the KAPTON brand polyimide available from E.I duPont deNemours and Co., Wilmington, Del.), polyparaphenylene (PPP, available from Maxdem, Inc., San Dimas, Calif.), poly (ethylene naphthalene 2,6-dicarboxylate, PEN), poly(ethylene naphthalate-co-2,6-bibenzoate, PENBB), polyethylene terephthalate (PET), polycarbonate (PC), cycloolefin copolymers (COC, such as, for example, TOPAS® available from Hoechst Technical Polymers), polyphenylene sulfide (PPS), PES (polyether sulfone), polyaryletherketone (PAEK), polysulfones, polyacrylates (e.g., crosslinked polymethyl methacrylate, PMMA) and the like and mixtures thereof. It will be recognized that this list is not exhaustive and that other materials can also be used in the composition of the second members 114.

For example, in more particular embodiments, the second members 114 can be formed from a liquid crystal polymer (LCP). The VECTRA® (available from Ticona Engineering Polymers) brand liquid crystal polymers can be used to form the second members 114. VECTRA® A950 is an aromatic copolyester that is believed to consist of approximately 70 mol % p-hydroxybenzoic acid (HBA) and approximately 30 mol % of 2,6-hydroxynaphthoic acid (HNA). VECTRA® A950 exhibits a coefficient of linear thermal expansion of approximately 4 m/m/° C. Upon subjection to environments with pressure and temperature ranges that are typically hostile to traditional valve and stem packing failure, VECTRA® A950 can provide enhanced structural stability and support. Additionally, exposure of VECTRA® A950 to aggressive chemicals can yield no appreciable change in properties, dimensions, or weight over time. VECTRA® A950 can be hydrolytically stable, resistant to organic solvents, and stable to some acids of <90% concentration. It can also be resistant to bases of <30% concentration, and it can retain its chemical resistance at elevated temperatures with minimal affect caused by fluctuating humidity. VECTRA® A950 can have a strength retention percentage of no less than 90% after chemical exposure to Acetone, hydrochloric acid, perchloroethylene, sodium hydroxide, and sulfuric acid.

In other embodiments, the second members 114 can comprise a polyaryletherketone (PAEK), such as, for example, a polyether ether ketone (PEEK). In particular, the second members 114 can comprise FLUOROLOY® A22 (available from Saint-Gobain Performance Plastics). FLUOROLOY® A22 exhibits a tensile strength, as measured according to ASTM D4894, of 108 MPa, an elongation, as measured according to ASTM D4894, of 35%, a compressive modulus, as measured according to ASTM D695, of 2,441 MPa, a deformation under load, as measured according to ASTM D621 and as tested at 2,000 PSI for 24 hours, of 0.03%, a Shore D hardness, as measured according to ASTM D2240, of 90, and a coefficient of linear thermal expansion, as measured according to ASTM E831 between 26° C. and 200° C., of 5.56 m/m/° C. Moreover, FLUOROLOY® A22 has a working temperature range of between −268° C. and 316° C.

In other embodiments, the second members 114 can be formed from a material having a low coefficient of linear thermal expansion (e.g., less than 6.0 m/m/° C.). In particular embodiments, the second members 114 can be formed from a material having a coefficient of linear thermal expansion, as measured between temperatures of −46° C. and 160° C., of less than $25 \times 10^{-5}$ m/m/° C., such as less than $20 \times 10^{-5}$ m/m/° C., less than $15 \times 10^{-5}$ m/m/° C., less than $10 \times 10^{-5}$ m/m/° C., less than $9 \times 10^{-5}$ m/m/° C., less than $8 \times 10^{-5}$ m/m/° C., less than $7 \times 10^{-5}$ m/m/° C., less than $6 \times 10^{-5}$ m/m/° C., or even less than $5 \times 10^{-5}$ m/m/° C. The coefficient of linear thermal expansion of the second member 114, as measured between temperatures of −46° C. and 160° C., can be no less than $-5 \times 10^{-5}$ m/m/° C., such as no less than $-4 \times 10^{-5}$ m/m/° C., no less than $-3 \times 10^{-5}$ m/m/° C., no less than $-2 \times 10^{-5}$ m/m/° C., no less than $-1 \times 10^{-5}$ m/m/° C., no less than 0 m/m/° C., no less than $1 \times 10^{-5}$ m/m/° C., no less than $2 \times 10^{-5}$ m/m/° C., no less than $3 \times 10^{-5}$ m/m/° C., no less than $4 \times 10^{-5}$ m/m/° C., or even no less than 5 m/m/° C. Moreover, the second member 114 can be formed from a material having a coefficient of linear thermal expansion between and including any of the values described above, such as, for example, between $3.0 \times 10^{-5}$ m/m/° C. and $7.0 \times 10^{-5}$ m/m/° C.

In further embodiments, the second members 114 can be formed from a material having a low elongation at break (e.g., less than 40%). In particular embodiments, the second member 114 can be formed from a material having an elongation at break, as measured according to ASTM D4894, of less than 50%, such as less than 40%, less than 30%, less than 20%, or even less than 10%. Moreover, the second members 114 can be formed from a material having an elongation at break of at least 0.5%. Additionally, the second member 114 can be formed from a material having an elongation at break between and including any of the values described above, such as, for example, between 30% and 35%. Materials having low elongation at break can exhibit high structural integrity during operation, such that they remain relatively rigid and relatively undeformed under sustained loading conditions.

In yet further embodiments, the second members 114 can be formed from a material having a high tensile strength (e.g., at least 80 MPa). For example, the second members 114 can be formed from a material having a tensile strength of at least 50 MPa, such as at least 75 MPa, at least 100 MPa, or even at least 150 MPa. Moreover, the second members 114 can be formed from a material having a low deformation under load according to ASTM D621 (e.g., no greater than 5%, such as no greater than 1%, no greater than 0.1%, or even no greater than 0.05%).

The second members 114 can also be formed from a material having a low gas-barrier property. As used herein, the term "gas-barrier property" defines the permeability of a material with respect to a tested fluid. In particular embodiments, the second members 114 can be formed from a material having an oxygen ($O_2$) permeability, as measured at 23° C., of less than $0.0003 \times 10^{-7}$ $cm^3$ $cm \cdot cm^{-2} s^{-1} Pa^{-1}$, such as less than $0.0003 \times 10^{-8}$ $cm^3 cm \cdot cm^{-2} s^{-1} Pa^{-1}$, less than $0.0003 \times 10^{-9}$ $cm^3$ $cm \cdot cm^{-2} s^{-1} Pa^{-1}$, less than $0.0003 \times 10^{-10}$ $cm^3 cm \cdot cm^{-2} s^{-1} Pa^{-1}$, less than $0.0003 \times 10^{-11}$ $cm^3 cm \cdot cm^{-2} s^{-1} Pa^{-1}$, less than $0.0003 \times 10^{-12}$ $cm^3 cm \cdot cm^{-2} s^{-1} Pa^{-1}$, or even less than $0.0003 \times 10^{-13}$ $cm^3 cm \cdot cm^{-2} s^{-1} Pa^{-1}$. Moreover, in particular embodiments the second members 114 can be formed from a material having a water ($H_2O$) permeability, as measured at 38° C., of less than $400 \times 10^{-7}$ $cm^3 cm \cdot cm^{-2} s^{-1} Pa^{-1}$, such as less than $400 \times 10^{-8}$ $cm^3 cm \cdot cm^{-2} s^{-1} Pa^{-1}$, less than $400 \times 10^{-9}$ $cm^3 cm \cdot cm^{-2} s^{-1} Pa^{-1}$, less than $400 \times 10^{-10}$ $cm^3 cm \cdot cm^{-2} s^{-1} Pa^{-1}$, less than $400 \times 10^{-11}$ $cm^3 cm \cdot cm^{-2} s^{-1} Pa^{-1}$, less than $400 \times 10^{-12}$ $cm^3 cm \cdot cm^{-2} s^{-1} Pa^{-1}$, or even less than $400 \times 10^{-13}$ $cm^3 cm \cdot cm^{-2} s^{-1} Pa^{-1}$.

In particular embodiments, a modulus of elasticity, $E_1$, of the first member 102 is less than a modulus of elasticity, $E_2$, of the second member 114. In particular, $E_2$ can be no less than 1.1 $E_1$, such as no less than 1.2 $E_1$, no less than 1.3 $E_1$, no less than 1.4 $E_1$, no less than 1.5 $E_1$, no less than 2.0 $E_1$, no less than 2.5 $E_1$, no less than 3.0 $E_1$, no less than 3.5 $E_1$, no less than 4.0 $E_1$, no less than 4.5 $E_1$, no less than 5.0 $E_1$, no less than 10.0 $E_1$, no less than 20.0 $E_1$, no less than 30.0 $E_1$, no less than 40.0 $E_1$, no less than 50.0 $E_1$, or even no less than 100.0 $E_1$. In further embodiments, $E_2$ can also be no greater than 2000 $E_1$, no greater than 1000 $E_1$, no greater than 500 $E_1$, no greater than 250 $E_1$, no greater than 200 $E_1$, or no greater than 150 $E_1$. Moreover, the ratio of $E_1$ to $E_2$ can be within a range between or including any of the values described above, such as, for example, $E_2$ can be between 20 $E_1$ and 150 $E_1$.

In other embodiments, $E_1$ can be in a range of between and including 0.01 GPa and 2.00 GPa, and $E_2$ can be in a range of between and including 5 GPa and 100 GPa. In further embodiments, $E_1$ can be in a range of between and including 0.25 GPa and 0.75 GPa, and $E_2$ can be in a range of between and including 10 GPa and 50 GPa. In yet more particular embodiments, $E_1$ can be in a range of between and including 0.5 GPa and 0.65 GPa, and $E_2$ can be in a range of between and including 10.5 GPa and 11 GPa.

In particular embodiments, an axial height, $H_1$, of the first members 102, as measured along the cross sectional center line 112, is less than an axial height, $H_2$, of the second members 114, as measured along the cross sectional center line 112. In particular embodiments $H_1$ can be greater than $H_2$. In such a manner, $H_1$ can be at least 1.1 $H_2$, such as at least 1.2 $H_2$, at least 1.3 $H_2$, at least 1.4 $H_2$, at least 1.5 $H_2$, at least 2.0 $H_2$, at least 2.5 $H_2$, at least 3.0 $H_2$, at least 3.5 $H_2$, or even at least 4.0 $H_2$. In further embodiments, $H_1$ can be no greater than 10 $H_2$, such as no greater than 9 $H_2$, no greater than 8 $H_2$, no greater than 7 $H_2$, no greater than 6 $H_2$, or even no greater than 5 $H_2$. Moreover, the value of $H_1$ can be within a range between and including any of the values described above, such as, for example, between 3.0 $H_2$ and 7.0 $H_2$.

In particular embodiments, a material volume, $V_1$, as defined by a total material volume of each first member 102 in the uncompressed state, can be less than a material volume, $V_2$, of each of the second members 114 in the uncompressed state. In particular, a ratio of $V_1:V_2$ can preferably be at least 0.25, such as at least 0.50, at least 0.75, at least 1.00, at least 1.50, at least 2.00, at least 2.50, at least 3.00, at least 4.00, at least 5.00, at least 10.00, at least 15.00, or even at least 20.00. Moreover, the ratio of $V_1:V_2$ can be no greater than 200, no greater than 150, no greater than 100, no greater than 75, no greater than 50, no greater than 25, or even no greater than 20. Additionally, the ratio of $V_1:V_2$ can be within a range between and including any of the values described above.

Valves, and more specifically valve packing assemblies, are generally classified by their leakage rate. Lower leakage rates are generally desirable in fluid systems where fluid leakage can result in a loss of materials or result in environmental hazard. The International Organization for Standardization (ISO) created ISO 15848-1 to define and classify valve packing assemblies by their leakage rates. Table 1, reproduced below, illustrates the standards as set forth in ISO 15848-1.

TABLE 1

| Classes for stem (or shaft) seals under ISO 15848-1 | |
| --- | --- |
| Class | Measured Leak Rate |
| A | $\leq 10^{-6}$ mgs$^{-1}$m$^{-1}$ |
| B | $\leq 10^{-4}$ mgs$^{-1}$m$^{-1}$ |
| C | $\leq 10^{-2}$ mgs$^{-1}$m$^{-1}$ |

Testing of valve leakage under the ISO specification is performed under vacuum conditions for a set duration of mechanical cycles within a predetermined thermal range. A mechanical cycle for an on-off valve is defined by the ISO specification as a motion of a valve obturator moving from the fully closed position to the fully open position, and returning to the fully closed position. The ISO specification sets the required minimum number of cycles for an on-off valve at 500 full stroke mechanical cycles with two thermal cycles. Such classification stage is identified as CO1. An extension to classification CO2 can be accomplished by an additional 1000 mechanical cycles with one additional thermal cycle. Further, extension to CO3 can be achieved by an additional 1000 mechanical cycles and one additional thermal cycle beyond CO2. Thus, to qualify as a classification CO3 on-off valve, testing requires four thermal cycles and 2,500 total mechanical cycles spaced therein.

The ISO specification allows the thermal cycles to be selected from a target temperature class, as illustrated in Table 2. A single thermal cycle is defined by the ISO specification as the change of the temperature from the room temperature (between approximately 20° C. and approximately 25° C.) to the specified test temperature, and return to the room temperature.

TABLE 2

| Temperature Classes | | | | |
|---|---|---|---|---|
| (t−196° C.) | (t−46° C.) | (tRoom Temperature) | (t200° C.) | (t400° C.) |

Thus, for example, testing at −196° C. qualifies the valve in the range from −196° C. to room temperature. Testing at −46° C. qualifies the valve in the range from −46° C. to room temperature. Testing at room temperature qualifies the valve in the range of −29° C. to 40° C. Testing at 200° C. qualifies the valve in the range from room temperature up to 200° C. Testing at 400° C. qualifies the valve in the range of room temperature up to 400° C. To qualify in a range from below room temperature to above room temperature (e.g., from −46° C. up to 200° C.), two tests are necessary a first test in a range from the below room temperature condition to room temperature and a second test in a range from room temperature to the above room temperature condition. For example, to qualify a valve in the range of −46° C. up to 200° C., a first test at −46° C. qualifies the valve in the range from −46° C. up to room temperature and a second test at 200° C. qualifies the valve in the range of room temperature up to 200° C.

Any temperatures not listed in table 2 can be selected using the same protocol for range selection as identified above. For example, testing can be performed between −50° C. and 160° C. by application of a first test at −50° C., which qualifies the valve in the range from −50° C. to room temperature, and a second test at 160° C., which qualifies the valve in the range of room temperature up to 160° C.

EXAMPLES

To test the effective seal formed by a packing assembly within a valve, a desirable temperature range of operation is first selected as previously described. The packing assembly is cleaned and dried. The packing assembly is inserted into the annular region formed between the stem and the inner wall of the valve bonnet. The stem has an outer diameter of 34.8 mm and the valve bonnet has an inner diameter of 46 mm. The packing assembly has a maximum cross-sectional diameter, as measured between an inner surface of the packing assembly in a normal direction towards the outer surface of the packing assembly, of 13 mm. A vacuum is then formed within the chamber and a test fluid is introduced into the valve. The test fluid is helium gas of 97% minimum purity.

Sample 1 is a packing assembly generally in accordance with FIG. 3, wherein the first member is formed from a modified polytetrafluoroethylene (PTFE) having an elongation at break of approximately 500% and a coefficient of linear thermal expansion of approximately 126 m/m/° C., and a second member formed from a lubricated organic-filled PTFE having an elongation at break of approximately 65% and a coefficient of linear thermal expansion of approximately 117 m/m/° C.

Sample 2 is a packing assembly generally in accordance with FIG. 4, wherein the first member is a modified PTFE having an elongation at break of approximately 500% and a coefficient of linear thermal expansion of approximately 126 m/m/° C., and wherein the second member is a polyaryletherketone (PEAK) having an elongation at break of approximately 35% and a coefficient of linear thermal expansion of approximately 3.09 m/m/° C. As illustrated in FIG. 4, the energizing member includes a scraper on the outer axial extension and a floating first component 154. As tested, the packing assembly is devoid of third and fourth members (illustrated in FIG. 4 as 200 and 202).

Sample 3 is a packing assembly generally in accordance with FIGS. 4 and 8B, wherein the first member is a modified PTFE having an elongation at break of approximately 500% and a coefficient of linear thermal expansion of approximately 126 m/m/° C., and wherein the second member is a polyaryletherketone (PEAK) having an elongation at break of approximately 35% and a coefficient of linear thermal expansion of approximately 3.09 m/m/° C. As illustrated in FIG. 8B, the energizing member of Sample 3 includes a scraper on both the inner and outer axial extensions, as well as a retaining axial extension extending from a distal end of the outer axial extension.

First, testing is conducted at 160° C. (i.e., ranging from room temperature up to 160° C.). The assemblies undergo a total of 500 mechanical cycles spanning two thermal cycles between 20° C. and 160° C. at a pressure gradient of 25 bar. Testing is then conducted at −46° C. (i.e., ranging from −46° C. to room temperature). The assemblies each undergo a total of 500 mechanical cycles spanning two thermal cycles between −46° C. and 20° C. at a pressure gradient of 25 bar. Surface roughness, Ra, of the valve bonnet is varied between tests between 0.05 μm and 0.2 μm and the respective leakage rates are recorded, as illustrated below in Table 3 and in FIGS. 10 to 13.

TABLE 3

| Test Data | | |
|---|---|---|
| | Surface Roughness of outer tool (Ra) | Maximum Leakage Rate (mbarl/s) |
| Sample 1 | 0.05 μm | $4.0 \times 10^{-2}$ |
| Sample 2 | 0.05 μm | $3.0 \times 10^{-5}$ |
| Sample 2 | 0.2 μm | $8.0 \times 10^{-3}$ |
| Sample 3 | 0.2 μm | $2.0 \times 10^{-5}$ |

Figure 10:
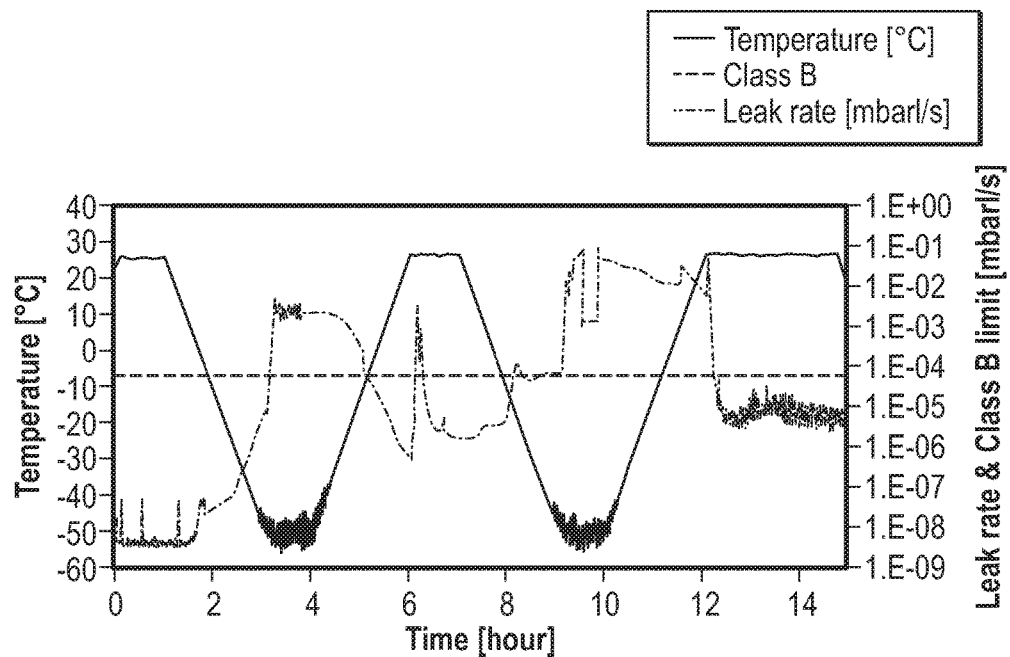
FIG. 10 includes a graph illustrating the leakage rate of a first packing assembly tested at −46° C.
Figure 11:
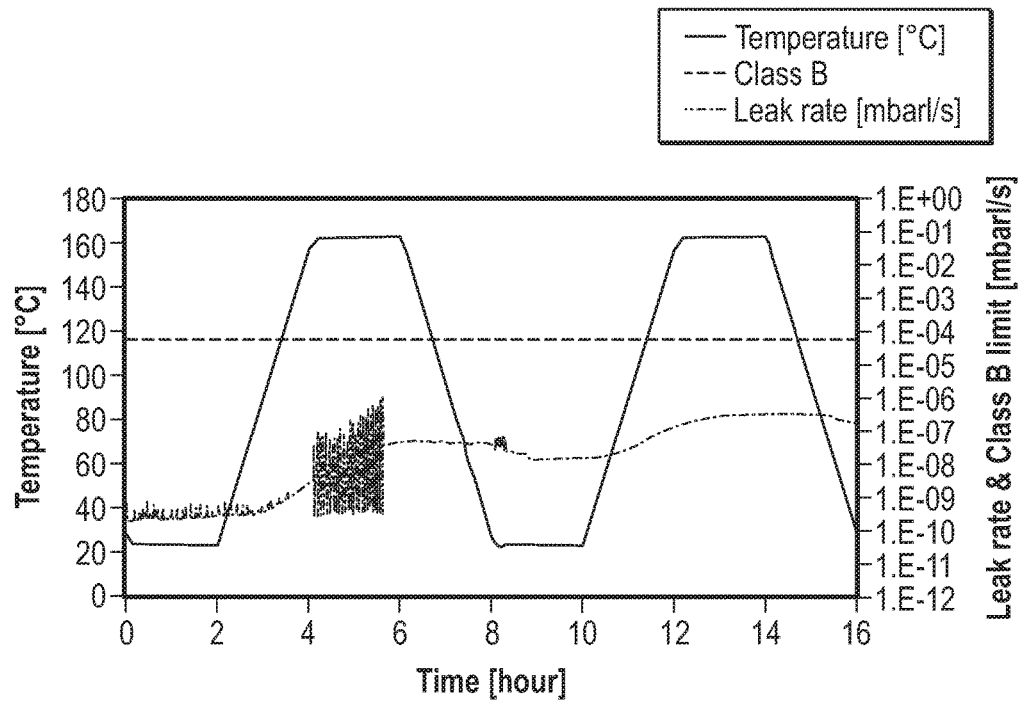
FIG. 11 includes a graph illustrating the leakage rate of a second packing assembly as tested at 160° C.
Figure 12:
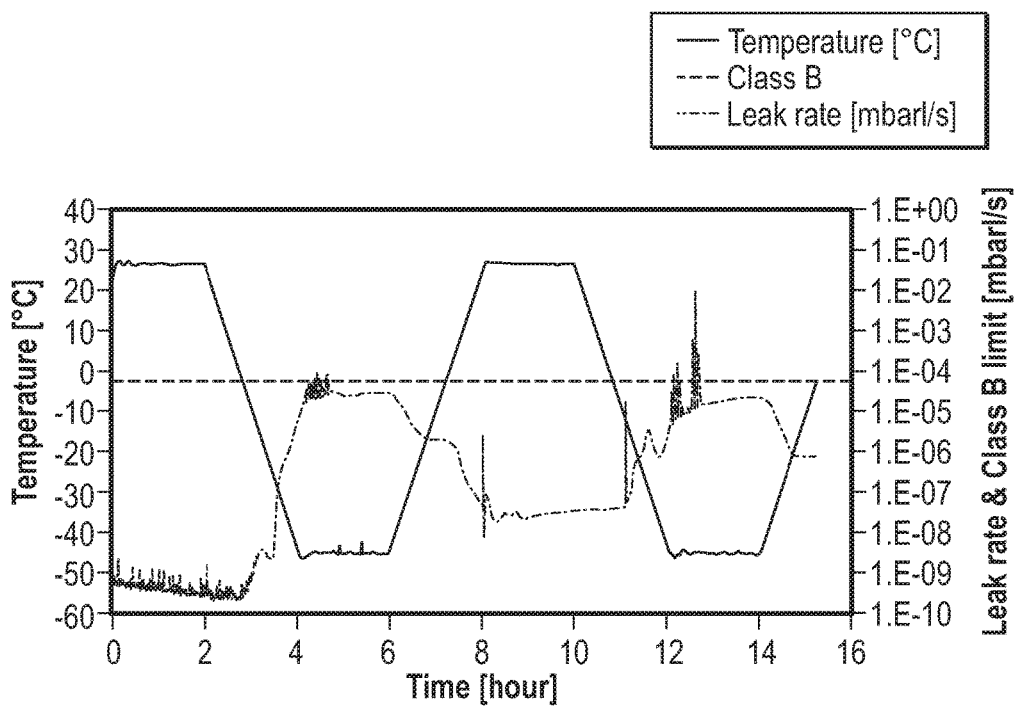
FIG. 12 includes a graph illustrating the leakage rate of the second packing assembly as tested at −46° C.
Figure 13:
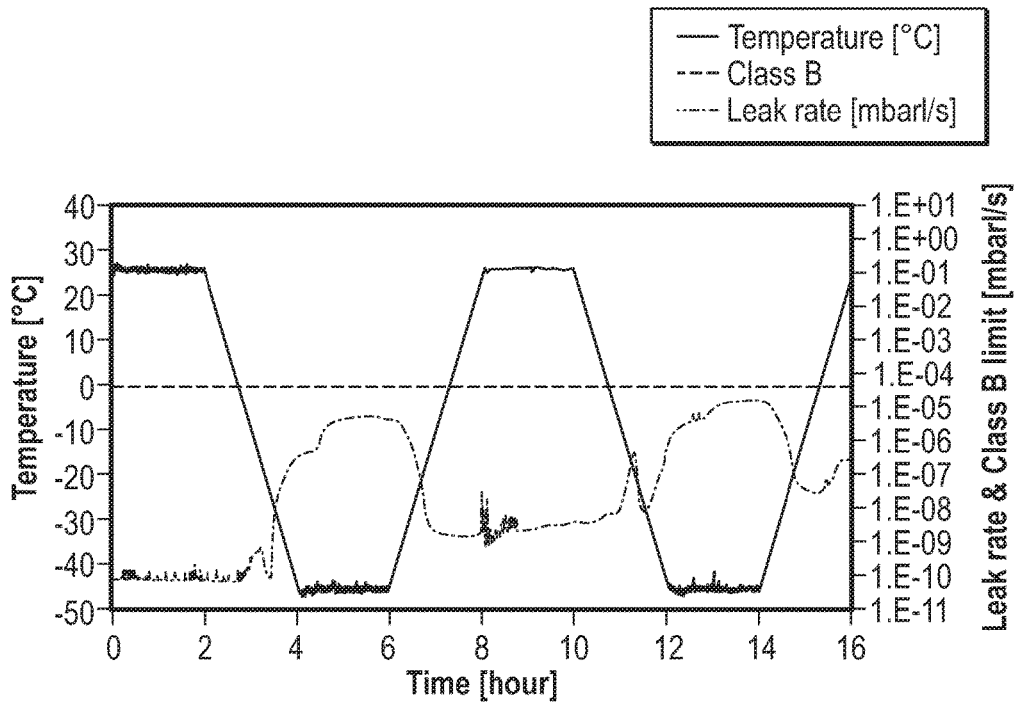
FIG. 13 includes a graph illustrating the leakage rate of a third packing assembly as tested at −46° C.

FIG. 10 illustrates the leakage rate of Sample 1 as measured at −46° C. FIGS. 11 and 12 illustrates the leakage rate of Sample 2 as measured at −46° C. and 160° C., respectively. FIG. 13 illustrates the leakage rate of sample 3 as measured at −46° C. Sample 3 performed similar to Sample 2 as measured at 160° C.

Samples 1, 2, and 3 all achieved class B status as measured according to ISO 15848-1 at 160° C. Comparing the samples at −46° C., as illustrated in Table 3 as well as FIGS. 10, 12 and 13, Sample 1 failed class B status after only 3 hours, and less than one complete thermal cycle. Samples 2 and 3 remained within class B status for 500 mechanical cycles when tested in an outer component having a surface roughness of 0.05 μm. Additionally, Sample 3 remained within class B status for 500 mechanical cycles when tested in an outer component having a surface roughness of 0.2 μm, while Sample 2 failed class B status for 500 mechanical cycles when tested in an outer component having a surface roughness of 0.2 μm.

Generally, in a first aspect, a stem packing assembly can include a first annular member defining a central axis, a second annular member defining a central axis coaxial with the central axis of the first annular member, and an annular energizing member defining a central axis coaxial with the central axis of the first annular member.

In a particular embodiment, the first annular member and the annular energizing member comprise a polytetrafluoroethylene (PTFE), and the second annular member comprises a polyarylethcrketone (PAEK).

In another embodiment, the stem packing assembly can have a leakage rate according to ISO 15848-1 of less than $1 \times 10^{-4}$ mgs$^{-1}$m$^{-1}$ for at least 500 cycles at 160° C., and less than $1 \times 10^{-4}$ mgs$^{-1}$m$^{-1}$ for at least 500 cycles at −46° C.

In a further embodiment, the annular energizing member can have an asymmetric cross-sectional profile, as seen when viewed along a plane extending radially outward from the central axis of the annular energizing member.

In yet a further embodiment, the annular energizing member can include a jacket and an energizing member disposed between the jacket and a third annular member.

Items.

Item 1. A stem packing assembly, comprising a plurality of seal elements positioned in axial alignment, each seal element having a first member and a second member, the first member comprising a viscoelastic material, and the second member comprising a material having at least one of the following characteristics: an elongation at break of less than 50%; or a coefficient of linear thermal expansion of less than $30 \times 10^{-5}$ m/m/° C.; or an $O_2$ permeability of less than $0.0003 \times 10^{-7}$ cm$^3$cm·cm$^{-2}$s$^{-1}$Pa$^{-1}$; or an $H_2O$ vapor permeability of less than $400 \times 10^{-7}$ cm$^3$cm·cm$^{-2}$s$^{-1}$Pa$^{-1}$.

Item 2. The stem packing assembly according to item 1, wherein the second member comprises a material having an elongation at break of less than 40%, such as less than 30%, less than 20%, or less than 10%.

Item 3. The stem packing assembly according to any one of the preceding items, wherein the second member comprises a material having a coefficient of linear thermal expansion of less than $25 \times 10^{-5}$ m/m/° C., such as less than $20 \times 10^{-5}$ m/m/° C., less than $15 \times 10^{-5}$ m/m/° C., less than $10 \times 10^{-5}$ m/m/° C., less than $9 \times 10^{-5}$ m/m/° C., less than $8 \times 10^{-5}$ m/m/° C., less than $7 \times 10^{-5}$ m/m/° C., less than $6 \times 10^{-5}$ m/m/° C., or less than $5 \times 10^{-5}$ m/m/° C.

Item 4. The stem packing assembly according to any one of the preceding items, wherein the second member comprises a material having a coefficient of linear thermal expansion of no less than $-5 \times 10^{-5}$ m/m/° C., such as no less than $-4 \times 10^{-5}$ m/m/° C., no less than $-3 \times 10^{-5}$ m/m/° C., no less than $-2 \times 10^{-5}$ m/m/° C., no less than $-1 \times 10^{-5}$ m/m/° C., no less than 0 m/m/° C., no less than $1 \times 10^{-5}$ m/m/° C., no less than $2 \times 10^{-5}$ m/m/° C., no less than $3 \times 10^{-5}$ m/m/° C., no less than $4 \times 10^{-5}$ m/m/° C., or no less than $5 \times 10^{-5}$ m/m/° C.

Item 5. The stem packing assembly according to any one of the preceding items, wherein the second member comprises a material having an $O_2$ permeability of less than $0.0003 \times 10^{-8}$ cm$^3$cm·cm$^{-2}$s$^{-1}$Pa$^{-1}$, less than $0.0003 \times 10^{-9}$ cm$^3$cm·cm$^{-2}$s$^{-1}$Pa$^{-1}$, less than $0.0003 \times 10^{-10}$ cm$^3$cm·cm$^{-2}$s$^{-1}$Pa$^{-1}$, less than $0.0003 \times 10^{-11}$ cm$^3$cm·cm$^{-2}$s$^{-1}$Pa$^{-1}$, less than $0.0003 \times 10^{-12}$ cm$^3$cm·cm$^{-2}$s$^{-1}$Pa$^{-1}$, or less than $0.0003 \times 10^{-13}$ cm$^3$cm·cm$^{-2}$s$^{-1}$Pa$^{-1}$.

Item 6. The stem packing assembly according to any one of the preceding items, wherein the second member comprises a material having an $H_2O$ vapor permeability of less than less than $400 \times 10^{-8}$ cm$^3$cm·cm$^{-2}$s$^{-1}$Pa$^{-1}$, less than $400 \times 10^{-9}$ cm$^3$cm·cm$^{-2}$s$^{-1}$Pa$^{-1}$, less than $400 \times 10^{-10}$ cm$^3$cm·cm$^{-2}$s$^{-1}$Pa$^{-1}$, less than $400 \times 10^{-11}$ cm$^3$cm·cm$^{-2}$s$^{-1}$Pa$^{-1}$, less than $400 \times 10^{-12}$ cm$^3$cm·cm$^{-2}$s$^{-1}$Pa$^{-1}$, less than $400 \times 10^{-13}$ cm$^3$cm·cm$^{-2}$s$^{-1}$Pa$^{-1}$.

Item 7. The stem packing assembly according to any one of the preceding items, wherein each of the first members further comprise a first complementary feature, and wherein each of the second members further comprise a second complementary feature engageable with the first complementary feature.

Item 8. The stem packing assembly according to item 7, wherein the first complementary feature comprises one of a notch and groove, and wherein the second complementary feature comprises the other of a notch and notch.

Item 9. The stem packing assembly according to any one of the preceding items, wherein the first member comprises a polymer, such as a fluoropolymer, such as PTFE.

Item 10. The stem packing assembly according to any one of the preceding items, wherein the second member comprises a dense polymer, such as an aromatic polyamide, such as an aromatic polyester, an aromatic polyether, or an aromatic polyeurathane.

Item 11. The stem packing assembly according to any one of the preceding items, wherein the second member comprises a semi-aromatic polyamide.

Item 12. The stem packing assembly according to any one of the preceding items, wherein the second member comprises a liquid crystal polymer.

Item 13. The stem packing assembly according to any one of the preceding items, wherein the second member comprises a PAEK, such as PEEK.

Item 14. The stem packing assembly according to any one of the preceding items, wherein each of the first members are engaged with one second member.

Item 15. The stem packing assembly according to any one of the preceding items, wherein each of the first members are statically engaged with one second member.

Item 16. The stem packing assembly according to any one of the preceding items, wherein each of the first members comprises a second surface, wherein the second surface defines two segments offset by a relative angle, $\alpha$, and wherein $\alpha$ is at least 5°, at least 10°, at least 25°, or at least 45°.

Item 17. The stem packing assembly according to item 16, wherein $\alpha$ is no greater than 60°, no greater than 50°, or no greater than 45°.

Item 18. The stem packing assembly according to any one of the preceding items, wherein the first member has an axial height, $H_1$, wherein the second member has an axial height, $H_2$, and wherein $H_1$ is greater than $H_2$.

Item 19. The stem packing assembly according to item 18, wherein $H_1$ is at least 1.1 $H_2$, such as at least 1.2 $H_2$, at least 1.3 $H_2$, at least 1.4 $H_2$, at least 1.5 $H_2$, at least 2.0 $H_2$, at least 2.5 $H_2$, at least 3.0 $H_2$, at least 3.5 $H_2$, at least 4.0 $H_2$.

Item 20. The stem packing assembly according to any one of items 18 or 19, wherein $H_1$ is no greater than 10 $H_2$, such as no greater than 9 $H_2$, no greater than 8 $H_2$, no greater than 7 $H_2$, no greater than 6 $H_2$, no greater than 5 $H_2$.

Item 21. The stem packing assembly according to any one of the preceding items, wherein each of the first members has a volume, $V_1$, wherein each of the second members has a volume $V_2$, and wherein a ratio of $V_1:V_2$ is at least 0.25, such as at least 0.50, at least 0.75, at least 1.00, at least 1.50, at least 2.00, at least 2.50, at least 3.00, at least 4.00, at least 5.00, at least 10.00, at least 15.00, at least 20.00.

Item 22. The stem packing assembly according to item 21, wherein the ratio of $V_1:V_2$ is no greater than 200, no greater than 150, no greater than 100, no greater than 75, no greater than 50, no greater than 25, no greater than 20.

Item 23. The stem packing assembly according to any one of the preceding items, wherein the first member has a modulus of elasticity, $E_1$, as measured at 20° C., wherein the second member has a modulus of elasticity, $E_2$, as measured at 20° C., and wherein $E_2$ is no less than $E_1$.

Item 24. The stem packing assembly according to item 23, wherein $E_2$ is no less than 1.1 $E_1$, no less than 1.2 $E_1$, no less than 1.3 $E_1$, no less than 1.4 $E_1$, no less than 1.5 $E_1$, no less than 2.0 $E_1$, no less than 2.5 $E_1$, no less than 3.0 $E_1$, no less than 3.5 $E_1$, no less than 4.0 $E_1$, no less than 4.5 $E_1$, no less than 5.0 $E_1$, no less than 10.0 $E_1$, no less than 20.0 $E_1$, no less than 30.0 $E_1$, no less than 40.0 $E_1$, no less than 50.0 $E_1$, no less than 100.0 $E_1$.

Item 25. The stem packing assembly according to any one of items 23 or 24, wherein $E_2$ is no greater than 500 $E_1$, no greater than 400 $E_1$, no greater than 300 $E_1$, no greater than E00 $S_1$, no greater than 150 $E_1$, no greater than 125 $E_1$.

Item 26. The stem packing assembly according to any one of the preceding items, wherein the assembly further comprises an energizing member.

Item 27. The stem packing assembly according to item 26, wherein the energizing member comprises a jacket having a cavity; and an energized element at least partially disposed within the cavity.

Item 28. The stem packing assembly according to item 27, wherein the energized element is a spring having a generally torus shape.

Item 29. The stem packing assembly according to any one of items 26-28, wherein the energized element comprises a metal or an alloy.

Item 30. The stem packing assembly according to any one of items 26-29, wherein the jacket has a generally U shaped cross-sectional configuration.

Item 31. The stem packing assembly according to any one of items 26-30, wherein the energized member has an asymmetrical cross sectional profile.

Item 32. The stem packing assembly according to any one of items 26-31, wherein the jacket further comprises a first extension and a second extension.

Item 33. The stem packing assembly according to item 32, wherein the first extension has a length that is greater than the second extension.

Item 34. The stem packing assembly according to any one of items 32 or 33, wherein the first extension further comprises a scraper.

Item 35. The stem packing assembly according to any one of items 32-34, wherein the second extension further comprises a scraper.

Item 36. A stem packing assembly, comprising a plurality of seal elements, each seal element having a first member and a second member, and wherein the assembly has a rate of leakage according to ISO 15848-1 of: less than $1\times10^{-4}$ $mgs^{-1}m^{-1}$ for at least 500 cycles at 160° C.; less than $1\times10^{-4}$ $mgs^{-1}m^{-1}$ for at least 500 cycles at −46° C.

Item 37. The stem packing assembly according to item 36, wherein the assembly has a rate of leakage according to ISO 15848-1 of less than $1\times10^{-6}$ $mgs^{-1}m^{-1}$ for at least 500 cycles at 160° C.

Item 38. The stem packing assembly according to any one of items 36 or 37, wherein the second member comprises an aromatic polymer.

Item 39. The stem packing assembly according to any one of items 36-38, wherein the second member comprises an aromatic polyamide, aromatic polyimide, aromatic polyester, or aromatic polyurethane.

Item 40. The stem packing assembly according to any one of items 36-39, wherein the second member comprises a liquid crystal polymer.

Item 41. The stem packing assembly according to any one of items 36-40, wherein the second member comprises a liquid crystal polymer unfilled.

Item 42. The stem packing assembly according to any one of items 36-41, wherein the second member comprises a PEAK, such as PEEK.

Item 43. The stem packing assembly according to any one of items 36-42, wherein the assembly further comprises an energized element engaged in axial alignment with one of the second elements.

Item 44. The stem packing assembly according to any one of items 36-43, wherein each of the first members has a generally V-shaped cross-sectional configuration.

Item 45. The stem packing assembly according to any one of items 36-44, wherein each the second members has a generally Y-shaped cross-sectional configuration.

Item 46. The stem packing assembly according to any one of items 36-45, wherein each of the first members comprise a first complementary feature, and wherein each of the second members comprise a second complementary feature engageable with the first complementary feature.

Item 47. The stem packing assembly according to item 46, wherein the first complementary feature comprises one of a notch and groove, and wherein the second complementary feature comprises the other of a notch and groove.

Item 48. The stem packing assembly according to any one of items 36-47, wherein the first member comprises a polymer, such as an inert polymer, such as a fluoropolymer, such as PTFE.

Item 49. A stem packing assembly comprising: a first annular member defining a central axis; a second annular member defining a central axis coaxial with the central axis of the first annular member; and an annular energizing member defining a central axis coaxial with the central axis of the first annular member wherein the stem packing assembly has a leakage rate according to ISO 15848-1 of: less than $1\times10^{-4}$ $mgs^{-1}m^{-1}$ for at least 500 cycles at 160° C., at least 1000 cycles at 160° C., or at least 2,000 cycles 160° C.; and less than $1\times10^{-4}$ $mgs^{-1}m^{-1}$ for at least 500 cycles at −46° C., at least 1000 cycles at −46° C., or at least 2,000 cycles at −46° C.

Item 50. A stem packing assembly comprising: a first annular member defining a central axis; a second annular member defining a central axis coaxial with the central axis of the first annular member; and an annular energizing member defining a central axis coaxial with the central axis of the first annular member, wherein the first annular member comprises a PAEK, such as PEEK, wherein the second annular member comprises a PTFE, and wherein the annular energizing member comprises a PTFE.

Item 51. A stem packing assembly comprising: a first annular member defining a central axis; a second annular member defining a central axis coaxial with the central axis of the first annular member; and an annular energizing member defining a central axis coaxial with the central axis of the first annular member, wherein, when viewed along a plane extending radially outward from the central axis of the annular energizing member, the annular energizing member comprises an asymmetric cross-sectional profile.

Item 52. A stem packing assembly comprising a first annular member defining a central axis; a second annular member defining a central axis coaxial with the central axis of the first annular member; and an annular energizing member defining a central axis coaxial with the central axis of the first annular member, wherein, when viewed along a plane extending radially outward from the central axis of the annular energizing member, the annular energizing member includes at least one scraper.

Item 53. A stem packing assembly comprising: a first annular member defining a central axis; a second annular member defining a central axis coaxial with the central axis of the first annular member; an annular energizing member defining a central axis coaxial with the central axis of the first annular member, the annular energizing member including a jacket and an energizing element; and a third annular member defining a central axis coaxial with the central axis of the first annular member, wherein the energizing member is disposed between the jacket and a third annular member.

Item 54. A stem packing assembly comprising: a first annular member defining a central axis; a second annular member defining a central axis coaxial with the central axis of the first annular member; an annular energizing member defining a central axis coaxial with the central axis of the first annular member, the annular energizing member including a jacket and an energizing element, wherein, when viewed along a plane extending radially outward from the central axis of the annular energizing member, the annular energizing member includes at least one scraper; wherein the stem packing assembly has a leakage rate according to ISO 15848-1 of less than $1 \times 10^{-4}$ mgs$^{-1}$m$^{-1}$ for at least 500 cycles at 160° C., and less than $1 \times 10^{-4}$ mgs$^{-1}$m$^{-1}$ for at least 500 cycles at $-46°$ C., and wherein the first annular member comprises a PAEK, such as PEEK, wherein the second annular member comprises a PTFE, and wherein the annular energizing member comprises a PTFE.

Item 55. The stem packing assembly according to any one of item 49-54, wherein the second member comprises a material having an elongation at break of less than 40%, such as less than 30%, less than 20%, or less than 10%.

Item 56. The stem packing assembly according to any one of items 49-55, wherein the second member comprises a material having a coefficient of linear thermal expansion of less than $25 \times 10^{-5}$ m/m/° C., such as less than $20 \times 10^{-5}$ m/m/° C., less than $15 \times 10^{-5}$ m/m/° C., less than $10 \times 10^{-5}$ m/m/° C., less than $9 \times 10^{-5}$ m/m/° C., less than $8 \times 10^{-5}$ m/m/° C., less than $7 \times 10^{-5}$ m/m/° C., less than $6 \times 10^{-5}$ m/m/° C., or less than $5 \times 10^{-5}$ m/m/° C.

Item 57. The stem packing assembly according to any one of items 49-56, wherein the second member comprises a material having a coefficient of linear thermal expansion of no less than $-5 \times 10^{-5}$ m/m/° C., such as no less than $-4 \times 10^{-5}$ m/m/° C., no less than $-3 \times 10^{-5}$ m/m/° C., no less than $-2 \times 10^{-5}$ m/m/° C., no less than $-1 \times 10^{-5}$ m/m/° C., no less than 0 m/m/° C., no less than $\times 10^{-5}$ m/m/° C., no less than $2 \times 10^{-5}$ m/m/° C., no less than $3 \times 10^{-5}$ m/m/° C., no less than $4 \times 10^{-5}$ m/m/° C., or no less than $5 \times 10^{-5}$ m/m/° C.

Item 58. The stem packing assembly according to any one of items 49-57, wherein the second member comprises a material having an $O_2$ permeability of less than $0.0003 \times 10^{-8}$ cm$^3$cm·cm$^{-2}$s$^{-1}$Pa$^{-1}$, less than $0.0003 \times 10^{-9}$ cm$^3$cm·cm$^{-2}$s$^{-1}$Pa$^{-1}$, less than $0.0003 \times 10^{-10}$ cm$^3$cm·cm$^{-2}$s$^{-1}$Pa$^{-1}$, less than $0.0003 \times 10^{-11}$ cm$^3$cm·cm$^{-2}$s$^{-1}$Pa$^{-1}$, less than $0.0003 \times 10^{-12}$ cm$^3$cm·cm$^{-2}$s$^{-1}$Pa$^{-1}$, or less than $0.0003 \times 10^{-13}$ cm$^3$cm·cm$^{-2}$s$^{-1}$Pa$^{-1}$.

Item 59. The stem packing assembly according to any one of items 49-58, wherein the second member comprises a material having an $H_2O$ vapor permeability of less than less than $400 \times 10^{-8}$ cm$^3$cm·cm$^{-2}$s$^{-1}$Pa$^{-1}$, less than $400 \times 10^{-9}$ cm$^3$cm·cm$^{-2}$s$^{-1}$Pa$^{-1}$, less than $400 \times 10^{-10}$ cm$^3$cm·cm$^{-2}$s$^{-1}$Pa$^{-1}$, less than $400 \times 10^{-11}$ cm$^3$cm·cm$^{-2}$s$^{-1}$Pa$^{-1}$, less than $400 \times 10^{-12}$ cm$^3$cm·cm$^{-2}$s$^{-1}$Pa$^{-1}$, less than $400 \times 10^{-13}$ cm$^3$cm·cm$^{-2}$s$^{-1}$Pa$^{-1}$.

Item 60. The stem packing assembly according to any one of items 49-59, wherein each of the first members further comprise a first complementary feature, and wherein each of the second members further comprise a second complementary feature engageable with the first complementary feature.

Item 61. The stem packing assembly according to item 60, wherein the first complementary feature comprises one of a notch and groove, and wherein the second complementary feature comprises the other of a notch and a groove.

Item 62. The stem packing assembly according to any one of items 49-61, wherein the first member comprises a polymer, such as a fluoropolymer, such as PTFE.

Item 63. The stem packing assembly according to any one of items 49-62, wherein the second member comprises a dense polymer, such as an aromatic polyamide, such as an aromatic polyester, an aromatic polyether, or an aromatic polyeurathane.

Item 64. The stem packing assembly according to any one of items 49-63, wherein the second member comprises a semi-aromatic polyamide.

Item 65. The stem packing assembly according to any one of items 49-64, wherein the second member comprises a liquid crystal polymer.

Item 66. The stem packing assembly according to any one of items 49-65, wherein the second member comprises a PAEK, such as PEEK.

Item 67. The stem packing assembly according to any one of items 49-66, wherein each of the first members are engaged with one second member.

Item 68. The stem packing assembly according to any one of items 49-67, wherein each of the first members are statically engaged with one second member.

Item 69. The stem packing assembly according to any one of items 49-68, wherein each of the first members comprises a second surface, wherein the second surface defines two segments offset by a relative angle, $\alpha$, and wherein $\alpha$ is at least 5°, at least 10°, at least 25°, or at least 45°.

Item 70. The stem packing assembly according to item 69, wherein $\alpha$ is no greater than 60°, no greater than 50°, or no greater than 45°.

Item 71. The stem packing assembly according to any one of items 49-70, wherein the first member has an axial height, $H_1$, wherein the second member has an axial height, $H_2$, and wherein $H_1$ is greater than $H_2$.

Item 72. The stem packing assembly according to item 71, wherein $H_1$ is at least 1.1 $H_2$, such as at least 1.2 $H_2$, at least 1.3 $H_2$, at least 1.4 $H_2$, at least 1.5 $H_2$, at least 2.0 $H_2$, at least 2.5 $H_2$, at least 3.0 $H_2$, at least 3.5 $H_2$, at least 4.0 $H_2$.

Item 73. The stem packing assembly according to any one of items 71 or 72, wherein $H_1$ is no greater than 10 $H_2$, such as no greater than 9 $H_2$, no greater than 8 $H_2$, no greater than 7 $H_2$, no greater than 6 $H_2$, no greater than 5 $H_2$.

Item 74. The stem packing assembly according to any one of items 49-73, wherein each of the first members has a volume, $V_1$, wherein each of the second members has a volume $V_2$, and wherein a ratio of $V_1:V_2$ is at least 0.25, such as at least 0.50, at least 0.75, at least 1.00, at least 1.50, at least 2.00, at least 2.50, at least 3.00, at least 4.00, at least 5.00, at least 10.00, at least 15.00, at least 20.00.

Item 75. The stem packing assembly according to item 74, wherein the ratio of $V_1:V_2$ is no greater than 200, no greater than 150, no greater than 100, no greater than 75, no greater than 50, no greater than 25, no greater than 20.

Item 76. The stem packing assembly according to any one of items 49-75, wherein the first member has a modulus of elasticity, $E_1$, as measured at 20° C., wherein the second member has a modulus of elasticity, $E_2$, as measured at 20° C., and wherein $E_2$ is no less than $E_1$.

Item 77. The stem packing assembly according to item 76, wherein $E_2$ is no less than 1.1 $E_1$, no less than 1.2 $E_1$, no less than 1.3 $E_1$, no less than 1.4 $E_1$, no less than 1.5 $E_1$, no less than 2.0 $E_1$, no less than 2.5 $E_1$, no less than 3.0 $E_1$, no less than 3.5 $E_1$, no less than 4.0 $E_1$, no less than 4.5 $E_1$, no less than 5.0 $E_1$, no less than 10.0 $E_1$, no less than 20.0 $E_1$, no less than 30.0 $E_1$, no less than 40.0 $E_1$, no less than 50.0 $E_1$, no less than 100.0 $E_1$.

Item 78. The stem packing assembly according to any one of items 76 or 77, wherein $E_2$ is no greater than 500 $E_1$, no greater than 400 $E_1$, no greater than 300 $E_1$, no greater than E00 $S_1$, no greater than 150 $E_1$, no greater than 125 $E_1$.

Item 79. The stem packing assembly according to any one of items 49-78, wherein the assembly further comprises an energizing member.

Item 80. The stem packing assembly according to item 79, wherein the energizing member comprises: a jacket having a cavity; and an energized element at least partially disposed within the cavity.

Item 81. The stem packing assembly according to item 80, wherein the energized element is a spring having a generally torus shape.

Item 82. The stem packing assembly according to any one of items 80 or 81, wherein the energized element comprises a metal or an alloy.

Item 83. The stem packing assembly according to any one of items 80-82, wherein the jacket has a generally U shaped cross-sectional configuration.

Item 84. The stem packing assembly according to any one of items 80-83, wherein the energized member has an asymmetrical cross sectional profile.

Item 85. The stem packing assembly according to any one of items 80-84, wherein the jacket further comprises a first extension and a second extension.

Item 86. The stem packing assembly according to item 85, wherein the first extension has a length that is greater than the second extension.

Item 87. The stem packing assembly according to any one of items 85 or 86, wherein the first extension further comprises a scraper Item 88. The stem packing assembly according to any one of items 85-87, wherein the second extension further comprises a scraper.

Item 89. The stem packing assembly according to any one of the preceding items, wherein the stem packing assembly has a leakage rate according to ISO 15848-1 of no greater than $2.0 \times 10^{-5}$ mgs$^{-1}$m$^{-1}$ for at least 500 cycles at −46° C.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A stem packing assembly comprising:
   a plurality of first annular members, having a first surface and a second surface, each defining a central axis;
   a plurality of second annular members, having a first surface and a second surface, each defining a central axis coaxial with the central axis of the first annular members, wherein consecutively arranged first annular members are spaced apart from one another by at least one of the second annular members and wherein at least one of the first and second surfaces of the first member defines an internal angle to offset two or more segments by a relative angle α to permit the first surface of the second member to splay the first member in the radial direction upon application of a axial loading condition; and
   an annular energizing member defining a central axis coaxial with the central axis of the first annular member, wherein the annular energizing member includes a first component and a second component, wherein the first component comprises a contiguous planar surface and the second component comprises a contiguous planar surface, wherein the contiguous planar surfaces of the first component and the second component contact each other, wherein the contiguous planar surfaces of the first component and second component are each perpendicular to the central axis, wherein the second component comprises a jacket having a cavity, and an energized element at least partially disposed within the cavity, wherein the second component is a single piece,
   wherein all of the first annular members comprise PTFE, wherein all of the second annular members comprise PAEK, and wherein the stem packing assembly has a leakage rate according to ISO 15848-1 of:
      less than $1 \times 10^{-4}$ mgs$^{-1}$m$^{-1}$ for at least 500 cycles at 160° C.; and
      less than $1 \times 10^{-4}$ mgs$^{-1}$m$^{-1}$ for at least 500 cycles at −46° C., and wherein the assembly further comprises a fourth member comprising a contiguous planar surface, wherein at least one of the first annular members comprises a contiguous planar surface, wherein the contiguous planar surfaces of the fourth annular member and the first annular member contact each other, and wherein the contiguous planar surfaces of the fourth annular member and the first annular member are each perpendicular to the central axis.

2. The stem packing assembly according to claim 1, wherein the jacket further comprises a first extension and a second extension.

3. The stem packing assembly according to claim 2, wherein the first extension has a length that is greater than the second extension.

4. The stem packing assembly according to claim 1, wherein the energized member has an asymmetrical cross-sectional profile.

5. The stem packing assembly according to claim 1, wherein the energized element comprises a toroidal shaped spring having a generally circular cross section.

6. The stem packing assembly according to claim 1, wherein each of the plurality of first annular members has a lower surface, and wherein the lower surface of at least one annular member of the plurality of first annular members has an internal angle, α, of at least 5° and no greater than 60°.

7. The stem packing assembly according to claim 1, wherein the second component is in axial alignment with the first component, and wherein the first component contacts the second annular member, and wherein the first and second components are adapted to independently float relative to one another.

8. A stem packing assembly comprising:
   a first sealing element including:
      a first annular member, having a first surface and a second surface, defining a central axis; and
      a second annular member, having a first surface and a second surface, defining a central axis axial with the central axis of the first annular member, the second annular member abutting the first annular member, wherein at least one of the first and second surfaces of the first member defines an internal angle to offset two or more segments by a relative angle α to permit the first surface of the second member to splay the first member in the radial direction upon application of a axial loading condition;

a second sealing element including:
  a third annular member defining a central axis coaxial with the central axis of the second annular member, the third annular member abutting the second annular member;
  a fourth annular member defining a central axis coaxial with the central axis of the third annular member, the fourth annular member abutting the third annular member, wherein the third annular member is bonded to the fourth annular member; and
  an annular energizing member defining a central axis coaxial with the central axis of the first annular member, wherein the annular energizing member includes a first component and a second component, wherein the first component comprises a contiguous planar surface and second component comprises a contiguous planar surface, wherein the contiguous planar surfaces of the first component and the second component contact each other, wherein the contiguous planar surfaces of the first component and second component are each perpendicular to the central axis, wherein the second component comprises a jacket having a cavity, and an energized element at least partially disposed within the cavity, wherein the jacket comprises a first extension having a scraper extending in a radial direction, and a retaining axial extension extending from the distal end of the first extension, and an energizing element, wherein the second component is a single piece;

wherein:
  the stem packing assembly has a leakage rate according to ISO 15848-1 of less than $1\times10^{-4}$ mgs$^{-1}$m$^{-1}$ for at least 500 cycles at 160° C., and less than $1\times10^{-4}$ mgs$^{-1}$m$^{-1}$ for at least 500 cycles at −46° C.,
  the first and third annular members comprise PTFE,
  the second and fourth annular members comprise PAEK, and
  the annular energizing member at least partially comprises PTFE, and wherein the assembly further comprises a fourth member comprising a contiguous planar surface, wherein at least one of the first annular members comprises a contiguous planar surface, wherein the contiguous planar surfaces of the fourth annular member and the first annular member contact each other, and wherein the contiguous planar surfaces of the fourth annular member and the first annular member are each perpendicular to the central axis.

9. The stem packing assembly according to claim 8, wherein the first annular member is engaged with the second member.

10. The stem packing assembly according to claim 8, wherein the energized member has an asymmetrical cross-sectional profile.

11. The stem packing assembly according to claim 8, wherein the first extension has a length that is greater than the second extension.

12. The stem packing assembly according to claim 8, further comprising a third annular member, wherein the energized element is disposed between the third annular member and the jacket.

13. A stem packing assembly comprising:
  an annular energizing member defining a central axis, wherein the annular energizing member includes a first component and a second component, wherein the first component comprises a contiguous planar surface and the second component comprises a contiguous planar surface, wherein the contiguous planar surfaces of the first component and the second component contact each other, wherein the contiguous planar surfaces of the first component and second component are each perpendicular to the central axis, wherein the second component comprises a jacket having a cavity and an energized element at least partially disposed within the cavity, wherein the jacket comprises a retention feature disposed along a surface of the cavity, wherein the energized element comprises a toroidal shaped spring having a generally circular cross section, wherein the second component is a single piece;
  a first annular member, having a first surface and a second surface, abutting and coaxial with the annular energizing member, wherein the first annular member comprises PTFE;
  a second annular member, having a first surface and a second surface, wherein at least one of the first and second surfaces of the first member defines an internal angle to offset two or more segments by a relative angle α to permit the first surface of the second member to splay the first member in the radial direction upon application of a axial loading condition, and wherein the second annular member comprises liquid crystal polymer or PAEK;
  a third annular member abutting and coaxial with the second annular member, wherein the third annular member comprises PTFE; and
  a fourth annular member bonded to and coaxial with the third annular member,
  wherein the fourth annular member comprises liquid crystal polymer or PAEK, wherein the stem packing assembly has a leakage rate according to ISO 15848-1 of:
    less than $1\times10^{-4}$ mgs$^{-1}$m for at least 500 cycles at 160° C.; and
    less than $1\times10^{-4}$ mgs$^{-1}$m$^{-1}$ for at least 500 cycles at −46° C., and wherein the assembly further comprises a fourth member comprising a contiguous planar surface, wherein at least one of the first annular members comprises a contiguous planar surface, wherein the contiguous planar surfaces of the fourth annular member and the first annular member contact each other, and wherein the contiguous planar surfaces of the fourth annular member and the first annular member are each perpendicular to the central axis.

14. The stem packing assembly according to claim 13, wherein the first component is in axial alignment with the second component, and wherein the first component contacts the second annular member, and wherein the first and second components are adapted to independently float relative to one another.

15. The stem packing assembly according to claim 13, wherein the stem packing assembly has a leakage rate according to ISO 15848-1 of no greater than $2.0\times10^{-5}$ mgs$^{-1}$m$^{-1}$ for at least 500 cycles at −46° C.

16. The stem packing assembly according to claim 13, wherein the annular energizing member has an asymmetric cross-sectional profile.

17. The stem packing assembly according to claim 13, wherein the jacket comprises a first extension and a second extension, and wherein the first extension is longer than the second extension.

18. The stem packing assembly according to claim 1, further comprising a third member opposite the fourth member.

19. The stem packing assembly according to claim 18, wherein the third member is disposed adjacent to the energized element.

\* \* \* \* \*